United States Patent [19]
Engst

[11] Patent Number: 4,723,653
[45] Date of Patent: Feb. 9, 1988

[54] HOSE BELT CONVEYER SYSTEM

[75] Inventor: Wilhelm Engst, Garbsen, Fed. Rep. of Germany

[73] Assignee: Continental Gummi-Werke Aktiengesellschaft, Hanover, Fed. Rep. of Germany

[21] Appl. No.: 833,903

[22] Filed: Feb. 26, 1986

[30] Foreign Application Priority Data

Feb. 27, 1985 [DE] Fed. Rep. of Germany ....... 3506829
Nov. 2, 1985 [DE] Fed. Rep. of Germany ....... 3538990

[51] Int. Cl.⁴ ............................................. B65G 15/08
[52] U.S. Cl. ..................................... 198/819; 198/827
[58] Field of Search ................ 198/819, 818, 827, 842

[56] References Cited
U.S. PATENT DOCUMENTS 4,144,964 3/1979 Valcalda ............................ 198/830

FOREIGN PATENT DOCUMENTS 2752410 5/1979 Fed. Rep. of Germany .
2094741 9/1982 United Kingdom .
2124576 2/1984 United Kingdom .
2137950 10/1984 United Kingdom .
 196602 7/1967 U.S.S.R. .

Primary Examiner—Robert J. Spar
Assistant Examiner—Cheryl L. Gastineau
Attorney, Agent, or Firm—Becker & Becker, Inc.

[57] ABSTRACT

A hose belt conveyer system is proposed in which the material that is to be conveyed is transported by a conveyer belt that can be closed to form a hose belt. The support rollers are arranged in the form of roller garlands, which results in a flexible adaptation to the belt volume, as well as advantages during assembly and repair and maintenance of the system. The significant positioning of the roller garlands and their rollers effects a low-wear and energy-saving operation of the system.

9 Claims, 1 Drawing Figure

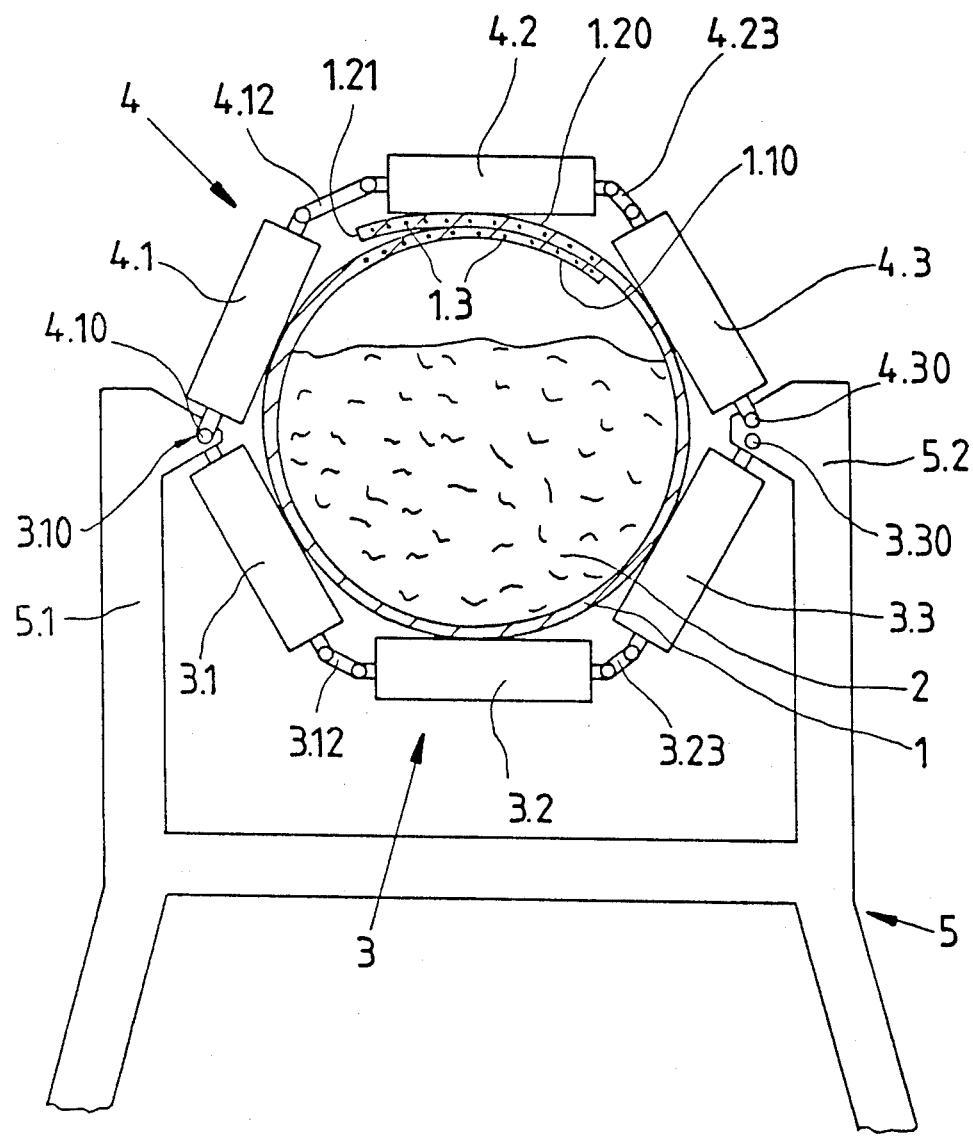

HOSE BELT CONVEYER SYSTEM

BACKGROUND OF THE INVENTION

1. Field of the Invention

The present invention relates to a hose belt conveyer system having a conveyer belt that is made of rubber or rubber-like synthetic material, contains filamentary strength or load-carriers which extend in the longitudinal direction of the belt, and that can be closed, by overlapping its longitudinal edge regions, to form a hose that is supported all the way around by support rollers.

2. Description of the Prior Art

Such hose belt conveyer systems are described, for example, in German Pat. No. 943 817 - Gielen dated June 1, 1956, German Offenlegungsschrift 1 934 342 - Bouzat et al dated July 16, 1970, and German Pat. No. 2 944 448 Hashimoto dated Oct. 4, 1984. The drawback with the known systems of this type is that the support and guide rollers, which support the conveyer belt and guide it in hose form, are rigidly disposed around the cross section of the belt, and have a constant symmetrical distribution therearound. As a result of this rigid arrangement of the rollers, a specific hose cross section, which is prescribed exactly by the position of the rollers, is constantly forced upon the conveyer belt, and this is true independent of the shape and distribution of the respectively transported material. With such a configuration, the material of the belt is greatly stressed, especially when bulky material is conveyed, which could damage the belt.

A very significant drawback of the heretofore known hose belt conveyer systems is that the assembly of the conveyer belt, as well as maintenance and repair, is very expensive, since the conveyer belt is very inaccessible due to the support frame that surrounds it, and on which the rollers are fixedly mounted.

In addition, due to the rigid, equidistant arrangement of the support rollers, the longitudinal edge of that belt edge region which overlaps during formation of the hose frequently collides with the end face of the adjacent lateral support roller. Over an interval of time, this results in damage to this longitudinal edge of the belt, thus requiring expensive repair or even replacement of the entire belt.

An object of the present invention therefore is to provide a belt conveying system of the aforementioned general type that does not have the previously mentioned drawbacks, and which, on the whole, is characterized by an optimum guidance of the belt.

SUMMARY OF THE INVENTION

Pursuant to the present invention, this object is realized by a belt conveying system with the support rollers being arranged in the form of known roller garlands or partial roller rings. In those sections of the conveyer system that are closed in the manner of a hose, respective roller garlands substantially surround the upper and the lower halves of the cross section of the hose belt. Preferably, an upper roller garland is associated with each of the lower roller garlands, with the upper and lower roller garlands being disposed either precisely across from one another, or being offset slightly relative to one another, when viewed in the longitudinal direction of the belt.

In one particularly advantageous embodiment, the end points of the roller garlands are mounted on the arms of support frames that are open upwardly in a U-shaped manner. With such an arrangement, it is readily possible, by releasing one of the end supports of the upper roller garland, to swing the latter away upwardly, as a result of which the hose belt is completely freely accessible from above. This considerably facilitates assembly of the conveyer belt, as well as all repair and maintenance work.

A further advantageous embodiment of the present invention is characterized in that on the upper roller garlands, in each case the distance between those two rollers that are disposed on both sides of the longitudinal edge of the overlapping belt edge region is greater than the distances between the remaining rollers. This prevents these longitudinal belt edges from striking the end faces of the laterally adjacent roller, and thus becoming damaged, when slight fluctuations or twists of the moving hose belt are encountered. This increased roller gap can be realized in particular by placing, between the two aforementioned rollers that are disposed on both sides of the longitudinal edge of the belt, a connecting link that is longer than the connecting links of the other rollers of the upper garlands, with the rollers themselves all having the same dimensions. The longer connecting link is preferably approximately twice as long as the remaining connecting links.

To further optimize guidance of the hose belt, it is furthermore proposed, in the region of those stretches where the hose belt travels through a right-hand or left-hand curve or turn, and consequently twists toward the right or the left about its longitudinal axis, to adapt the suspension of the roller garlands to this twist. This is accomplished by mounting the respective end supports of the garlands on the support frames of the conveyer system in a position that is twisted about the longitudinal axis of the belt by the same angle.

The conveyer belt that is used in the inventive belt conveying system, and that can be shaped to form a hose belt, contains embedded, filamentary strength or load-carriers that extend in the longitudinal direction of the belt, with these load-carriers preferably being disposed exclusively in the region of the longitudinal edges of the belt. In particular, these load-carriers are disposed only to the extent that these longitudinal edges overlap one another in those stretches that are closed in the form of a hose. By means of these longitudinal load-carriers, the driving force, which is introduced from a drive roller about which the belt is looped in a flat position at the direction-reversal point of the conveyer system, is transmitted uniformly to the entire belt. The effect that the limitation of the longitudinal load-carriers has on the longitudinal edges of the belt is that, in those stretches of the system that are closed in the manner of a hose, the belt assures the elastic flexibility of the side walls and underside of the hose that is required at this location in order for the belt to travel through right-hand or left-hand curves without difficulty.

BRIEF DESCRIPTION OF THE DRAWING

The drawing explains the present invention with the aid of a very simplified illustration of the essential features.

DESCRIPTION OF PREFERRED EMBODIMENTS

The conveyer belt 1, which is formed into a hose belt and confines the material 2 that is to be conveyed, is made in a known manner of, for example, a synthetic rubber. The lower half of the cross section of the belt 1 is supported by the rollers 3.1, 3.2, and 3.3 of the lower garland or partial ring of rollers 3, whereas the upper half of the cross section of the belt 1 is guided by the rollers 4.1, 4.2, and 4.3 of the upper garland or partial ring of rollers 4 in such a way that the belt edges 1.10 and 1.20 overlap one another.

As described, the conveyer belt, in its overlapping edge regions 1.10 and 1.20 only, contains embedded strength or load-carriers 1.3, for example in the form of steel wires, that are continuous in the longitudinal direction. The central region of the belt can contain conventional reinforcing inserts that extend in the transverse or diagonal direction, and are not illustrated in the drawing. These reinforcing inserts serve as a protection against puncture, and increase the load-carrying capacity of the belt.

The roller garlands 3 and 4 are pivotably or hingedly mounted to the arms 5.1 and 5.2 of the support frame 5 at the end points 3.10, 3.30 and 4.10, 4.30. The rollers, which are rotatable about their shafts, are pivotably or hingedly interconnected via connecting links 3.12, 3.23 and 4.12, 4.23. The longer connecting link 4.12 assures that the longitudinal edge 1.21 of the overlapping belt edge region 1.20 maintains a distance from the laterally adjacent roller 4.1 that is sufficient, even during fluctuations of the belt path, to avoid collisions of the belt edge 1.21 with the end face of this roller 4.1, thus avoiding damages to the belt edge.

The present invention is, of course, in no way restricted to the specific disclosure of the specification and drawings, but also encompasses any modifications within the scope of the appended claims.

What I claims is:

1. In a hose belt conveyer system having a hose-shaped conveyer belt that is made of rubber or rubber-like synthetic material and that has longitudinal edge regions, and that can be closed, by overlapping said longitudinal edge regions thereof, to form a hose belt that is supported all the way around by support rollers, the improvement in combination therewith which comprises that:
    said rollers are divided into garlands of rollers located oppositely in pairs; in particular, in a given stretch of the conveyer system that has been closed in the manner of a hose, a first garland of rollers is provided that substantially surrounds the lower half of the cross section of said hose belt flexibly supported by said first garland of rollers, and a second garland of rollers is provided that substantially surrounds the upper half of the cross section of said hose belt flexibly pressed down by said second garland of rollers, said first and second garlands of rollers also overcoming problems in straight-ahead and curve guidance of said hose-shaped conveyer belt and being individually journaled and pivotally mounted independently of each other so that varying cross-sections of the hose-shaped conveyer belt are flexibly accommodated without the hose-shaped conveyer belt ever passing between said first and second garlands of rollers in an uncontrolled manner because said first and second garlands of rollers completely flexibly surround said hose-shaped conveyer belt all the way around by support rollers
    wherein a plurality of said rollers are pivotally interconnected together so as to form the said garland, each of said garlands being self-supporting and being secured only at its ends to a supporting framework.

2. A hose belt conveyer system having a conveyer belt that is made of rubber or rubber-like synthetic material and that has longitudinal edge regions and that can be closed, by overlapping said longitudinal edge regions thereof, to form a hose belt that is supported all the way around by support rollers, with the improvement comprised therein that:
    said rollers are divided into garlands of rollers located oppositely in pairs; in particular, in a given stretch of the conveyer system that has been closed in the manner of a hose, a first garland of rollers is provided that substantially surrounds the lower half of the cross section of said hose belt flexibly supported by said first garland of rollers, and a second garland of rollers is provided that substantially surrounds the upper half of the cross section of said hose belt flexibly pressed down by said second garland of rollers, said first and second garlands of rollers also overcoming problems in straight-ahead and curve guidance of said hose belt and being journaled independently of each other; and
    in a given one of said second garland of rollers, the overlapping one of said belt edge regions has a longitudinal edge that is disposed in a region between two of said rollers, with the distance between these two last-mentioned rollers being greater than the distance between the other rollers of said second garland of rollers.

3. A conveyer system according to claim 2, in which, in a given stretch of the conveyer system that has been closed in the manner of a hose, a second garland of rollers is associated with each first garland of rollers, with said first and second garlands being offset relative to one another when viewed in the longitudinal direction of said belt.

4. A conveyer system according to claim 2, which includes support frames, each of which is provided with arms that are arranged in such a way that said support frames are U-shaped, being open upwardly; and in which each of said first and second garlands of rollers has two end points, each of which is mounted on a respective one of said arms.

5. A conveyer system according to claim 2, which includes connecting links for interconnecting said rollers of said second garland of rollers, with all of said rollers having the same dimensions, and with the length of that connecting link that interconnects those two rollers between which said longitudinal edge of said overlapping belt edge region is disposed being longer than the length of the other connecting links.

6. A conveyer system according to claim 5, in which said longer connecting link is approximately twice as long as the other connecting links.

7. A conveyer system according to claim 2, which includes stretches of the conveyer system that are closed in the manner of a hose and that extend through a right-hand or left-hand curve, with said belt consequently being twisted about its longitudinal axis to the right or left in conformity with said curve; in the region of a given one of said curved stretches, said end points of the garlands of rollers disposed there are mounted on said arms of said support frame in a position that is twisted about said longitudinal axis of said belt by the same angle as the twist of said belt itself.

8. A conveyer system according to claim 2, in which filamentary load-carriers of said conveyer belt extend longitudinally thereof and are embedded in only said edge regions of said belt.

9. A conveyer system according to claim 8, in which load-carriers of said belt are embedded in only those portions of said belt edge regions that overlap one another in stretches of said conveyer system that are closed in the manner of a hose.

* * * * *